US012606064B2

(12) United States Patent
Hayakawa et al.

(10) Patent No.: US 12,606,064 B2
(45) Date of Patent: Apr. 21, 2026

(54) VEHICLE STRUCTURE WITH ANCHOR UNIT

(71) Applicant: HONDA MOTOR CO., LTD., Tokyo (JP)

(72) Inventors: Hirotaka Hayakawa, Tokyo (JP); Kazuya Kimura, Tokyo (JP)

(73) Assignee: HONDA MOTOR CO., LTD., Tokyo (JP)

(*) Notice: Subject to any disclaimer, the term of this patent is extended or adjusted under 35 U.S.C. 154(b) by 380 days.

(21) Appl. No.: 18/127,695

(22) Filed: Mar. 29, 2023

(65) Prior Publication Data

US 2023/0311722 A1 Oct. 5, 2023

(30) Foreign Application Priority Data

Mar. 31, 2022 (JP) .................................. 2022-059714

(51) Int. Cl.
*B60N 2/28* (2006.01)
*B62D 25/20* (2006.01)

(52) U.S. Cl.
CPC ............. *B60N 2/289* (2013.01); *B62D 25/20* (2013.01)

(58) Field of Classification Search
CPC ........ B60N 2/289; B60N 2/26; B60N 2/2824; B62D 25/20
USPC ......................................................... 296/63
See application file for complete search history.

(56) References Cited

U.S. PATENT DOCUMENTS

2017/0113541 A1* 4/2017 Muramatsu .......... B60K 15/063

FOREIGN PATENT DOCUMENTS

| CN | 105764746 | 7/2016 |
|----|-----------|--------|
| CN | 106627779 | 5/2017 |
| CN | 113329932 | 8/2021 |
| JP | 2003-312332 | 11/2003 |
| JP | 2004-256057 | 9/2004 |
| JP | 2010-042726 | 2/2010 |

OTHER PUBLICATIONS

Chinese Office Action for Chinese Patent Application No. 202310254311.X mailed Sep. 26, 2025.

* cited by examiner

*Primary Examiner* — Amy R Weisberg
*Assistant Examiner* — Philip Charles Adams
(74) *Attorney, Agent, or Firm* — Amin, Turocy & Watson, LLP

(57) ABSTRACT

A vehicle structure with an anchor unit includes a rear floor panel, a pair of first anchor members, and a reinforcement member. A rear seat is disposed above the rear floor panel. The pair of first anchor members are disposed on the rear floor panel and attached to a child seat. The reinforcement member connects the pair of first anchor members to the rear floor panel. In addition, the reinforcement member connects the pair of first anchor members.

8 Claims, 6 Drawing Sheets

FIG. 3

VEHICLE STRUCTURE WITH ANCHOR UNIT

CROSS-REFERENCE TO RELATED APPLICATION

Priority is claimed on Japanese Patent Application No. 2022-059714, filed on Mar. 31, 2022, the contents of which are incorporated herein by reference.

BACKGROUND

Field of the Invention

The present invention relates to a vehicle structure with an anchor unit.

Background

As a vehicle structure with an anchor unit, a configuration in which an anchor bar is connected to a rear floor panel by a bracket, a striker (hereinafter, may be referred to as an anchor member) is attached to the bracket, and a marking member is disposed at a vehicle forward position of the anchor member is known. A position of the anchor member can be easily checked by looking at the marking member, and a child seat can be easily attached to the anchor member (for example, see Japanese Unexamined Patent Application, First Publication No. 2003-312332).

SUMMARY

However, in the vehicle structure with an anchor unit disclosed in Japanese Unexamined Patent Application, First Publication No. 2003-312332, for example, it is conceivable that an excessive tensile load be input to the anchor member to which the child seat is attached. In this case, deformation or damage may occur in the rear floor panel. As a counter-measure, for example, it is necessary to individually rein-force the anchor members provided on left and rights in the vehicle width direction with reinforcement patches, or the like, respectively, to curb occurrence of deformation or damage to the rear floor panel. For this reason, weight is increased due to the reinforcement patches or the like, which may hinder reduction in weight of the vehicle.

Further, an occupancy space of a passenger compartment may be reduced in size due to the reinforcement patches or the like when reinforcing the anchor members with rein-forcement patches or the like, which may hinder habitability of the passenger compartment.

An aspect of the present invention is directed to providing a vehicle structure with an anchor unit in which deformation of a rear floor panel due to a tensile load from a seat belt is able to be curbed without hindering weight reduction or habitability.

A vehicle structure with an anchor unit according to a first aspect of the present invention includes: a rear floor panel above which a rear seat is disposed; a plurality of anchor members disposed on the rear floor panel and to which a child seat is attached; and a reinforcement member that connects the anchor members to the rear floor panel, wherein the reinforcement member connects the plurality of anchor members.

According to the above-mentioned configuration, for example, the child seat is connected to any one of the plurality of anchor members. Accordingly, a tensile load is input from the child seat to the anchor member to which the child seat is connected. Here, the plurality of anchor members are connected by the reinforcement member and connected to the rear floor panel. That is, the plurality of anchor members are connected by one reinforcement member.

Accordingly, when a tensile load is input from the child seat to the anchor member to which the child seat is connected, the input tensile load can be transmitted from the anchor member toward the other anchor members via the reinforcement member. Accordingly, the input tensile load can be supported by the plurality of anchor members. Accordingly, it is possible to curb the anchor member being damaged (breaking) due to the tensile load and the rear floor panel from being deformed. Accordingly, there is no need to individually provide a reinforcement member for each of the plurality of anchor members, and it is possible to prevent reduction in weight of the vehicle and habitability of a passenger compartment from being hindered.

In a second aspect, the anchor member may have: a fixing portion formed along a wall extending in an upward/down-ward direction of the rear floor panel; and a locking portion extending in a vehicle forward direction from the fixing portion.

According to the above-mentioned configuration, the fix-ing portion (i.e., the anchor member) can be strongly sup-ported by the wall extending in the upward/downward direction of the rear floor panel.

A third aspect may include a cross member that forms a hollow cross section together with the rear floor panel at a vehicle rearward side of the anchor member, and the rein-forcement member may be joined along a longitudinal direction of the cross member.

According to the above-mentioned configuration, the ten-sile load input from the child seat can be transmitted from the anchor member to the cross member via the reinforce-ment member. Accordingly, the input tensile load can be supported by the cross member. Accordingly, it is possible to curb the anchor member being damaged due to the tensile load or the rear floor panel from being deformed.

In a fourth aspect, the cross member may include: a cross section forming portion that forms a hollow cross section together with the rear floor panel; and a flange portion joined to the rear floor panel, and the reinforcement member may be joined in a state where the reinforcement member is sandwiched between the rear floor panel and the flange portion.

According to the above-mentioned configuration, since the reinforcement member is bonded while being sand-wiched between the flange portion of the cross member and the rear floor panel, the reinforcement member can be strongly bonded to the cross member. Accordingly, the tensile load input from the anchor member to the reinforce-ment member can be transmitted to the cross section form-ing portion of the cross member via the flange portion. The cross section forming portion of the cross member forms the hollow cross section together with the rear floor panel to thereby increase a rigidity thereof. Accordingly, the trans-mitted tensile load can be supported by the cross section forming portion (i.e., the cross member). Accordingly, it is possible to prevent the reinforcement member from peeling off from the rear floor panel and suppress deformation of the rear floor panel.

In a fifth aspect, the reinforcement member may include an attachment bead to which the anchor member is attached, and the attachment bead may be continuous with a lateral bead extending in a longitudinal direction of the reinforce-ment member.

According to the above-mentioned configuration, the tensile load input from the anchor member can be transmitted to the lateral bead via the attachment bead. Accordingly, rigidity of the reinforcement member against the tensile load can be increased. Accordingly, the tensile load input from the child seat can be appropriately transmitted to the cross member via the reinforcement member. Accordingly, it is possible to curb the anchor member being damaged due to the tensile load or the rear floor panel from being deformed.

A sixth aspect may include a stiffener extending in a vehicle forward/rearward direction on an outer side of a passenger compartment of the rear floor panel, wherein the stiffener may overlap the reinforcement member in an upward/downward direction, and at least part of the stiffener may be joined to the reinforcement member.

According to the above-mentioned configuration, the stiffener is provided on the rear floor panel, and at least part of the stiffener is joined to the reinforcement member. Accordingly, the tensile load input from the anchor member can be transmitted to the stiffener via the reinforcement member. Accordingly, rigidity of the rear floor panel against the tensile load can be increased around the anchor member. Accordingly, deformation of the rear floor panel due to the tensile load can be suppressed.

In a seventh aspect, the stiffener may include front and rear beads extending from a vehicle further forward position than the reinforcement member to a vehicle rearward direction so as to cross the cross member and extending in the vehicle forward/rearward direction.

According to the above-mentioned configuration, the tensile load input from the anchor member can be transmitted to the cross member via the stiffener (in particular, front and rear beads). Accordingly, rigidity of the rear floor panel against the tensile load can be further increased around the anchor member. Accordingly, deformation of the rear floor panel due to the tensile load can be suppressed.

An eighth aspect may include: a rear side frame extending in a vehicle forward/rearward direction at an outer side in a vehicle width direction of the rear floor panel; a damper housing disposed on an outer side in the vehicle width direction of the rear side frame; and a reinforcement frame disposed on the damper housing and extending in a vehicle upward/downward direction, and the cross member may be connected to the reinforcement frame.

According to the above-mentioned configuration, the tensile load input from the anchor member can be transmitted to the reinforcement frame via the reinforcement member and the cross member. Accordingly, rigidity of the rear floor panel against the tensile load can be further increased around the anchor member. Accordingly, deformation of the rear floor panel due to the tensile load can be suppressed.

A ninth aspect may include another anchor member provided on the rear side frame, and a child seat may be attached to the anchor member and the other anchor member.

According to the above-mentioned configuration, the child seat is attached to the anchor member and the other anchor member. Hereinafter, the anchor member may be referred to as a first anchor member, and the other anchor member may be referred to as a second anchor member. Here, the plurality of anchor members are connected by the reinforcement member. Accordingly, when the tensile load is input from the child seat to the first anchor member and the second anchor member, the tensile load input to the first anchor member can be transmitted toward the first anchor member on the other side via the reinforcement member. Accordingly, the input tensile load can be supported by the plurality of first anchor members. Accordingly, it is possible to curb the anchor member being damaged due to the tensile load or the rear floor panel from being deformed.

According to the aspect of the present invention, it is possible to suppress deformation of the rear floor panel due to the tensile load from the seat belt without hindering weight reduction or habitability.

BRIEF DESCRIPTION OF THE DRAWINGS

FIG. 3 is a cross-sectional view along line III-III in FIG. 2.

DESCRIPTION OF EMBODIMENTS

Figure 1:
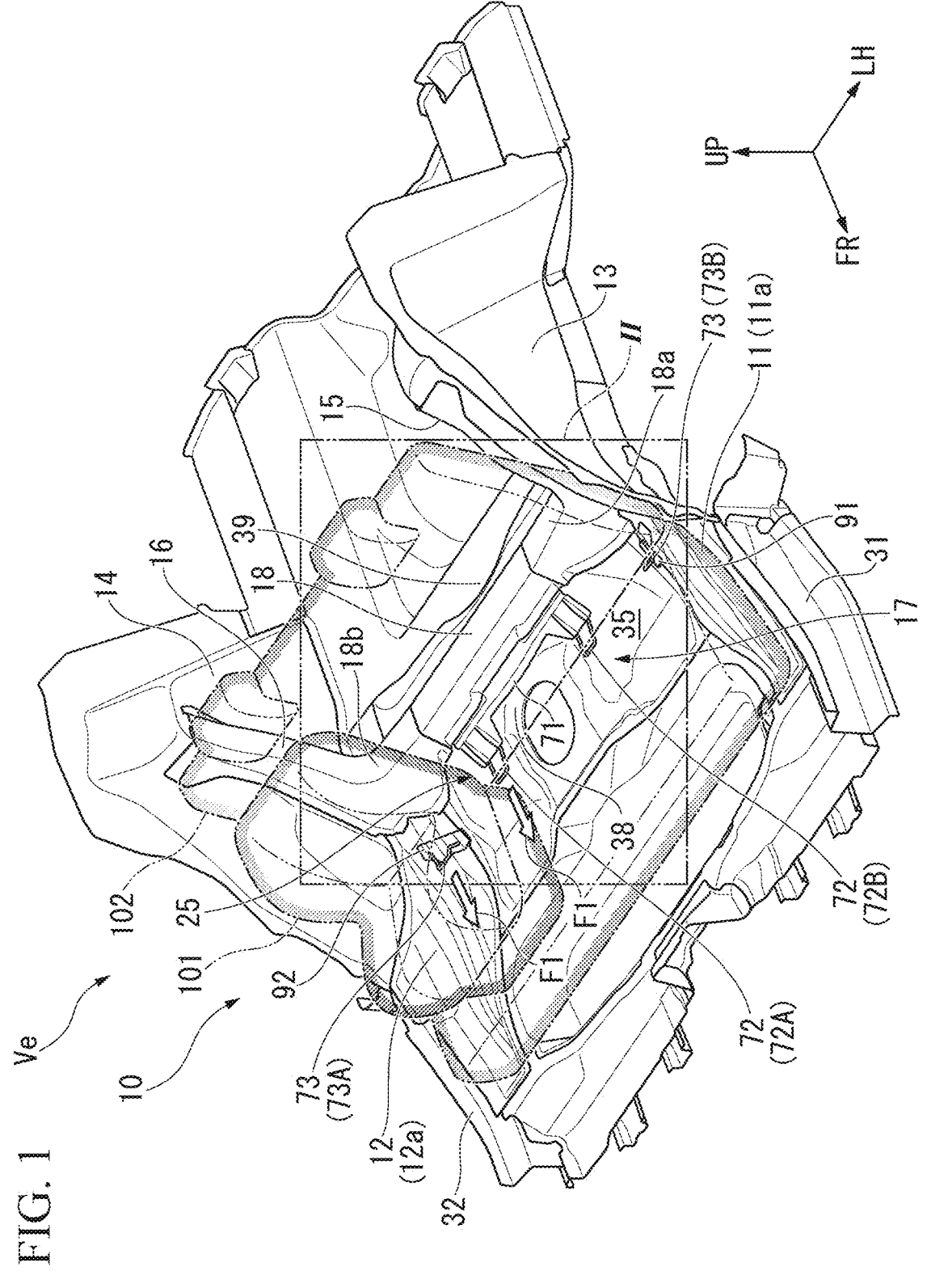
FIG. 1 is a perspective view showing a vehicle structure with an anchor unit according to an embodiment of the present invention.

Hereinafter, a vehicle structure with an anchor unit according to an embodiment of the present invention will be described with reference to the accompanying drawings. Further, in the drawings, an arrow FR indicates a forward direction of a vehicle, an arrow UP indicates an upward direction of the vehicle, and an arrow LH indicates a leftward direction of the vehicle.

<Vehicle Structure with Anchor Unit>

Figure 2:
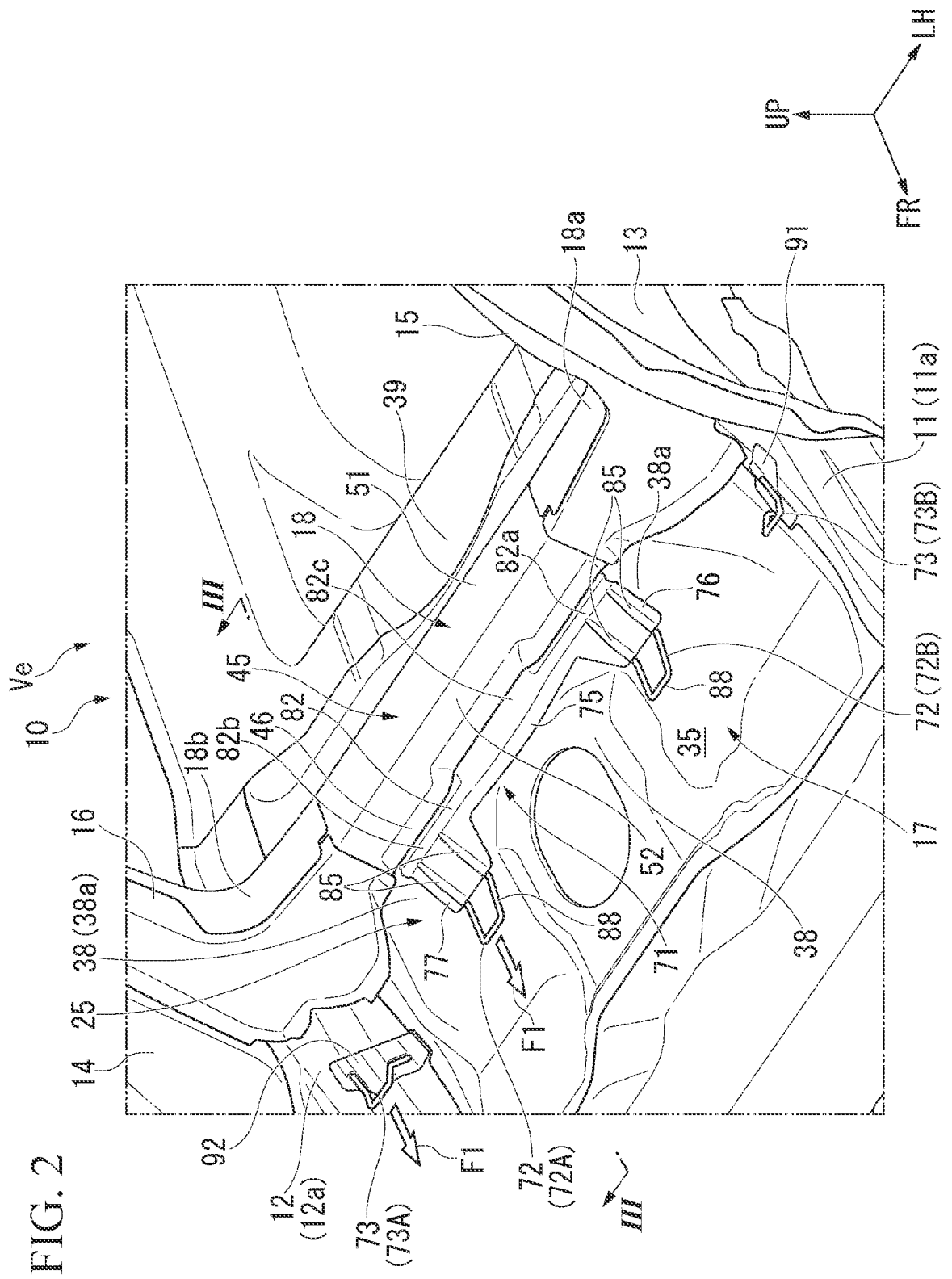
FIG. 2 is an enlarged perspective view of a portion II in FIG. 1.

FIG. 1 is a perspective view showing a vehicle structure 10 with an anchor unit according to an embodiment. FIG. 2 is an enlarged perspective view of a portion II in FIG. 1.

As shown in FIG. 1 and FIG. 2, a vehicle Ve includes the vehicle structure 10 with an anchor unit, for example, on a rear section of the vehicle Ve. Hereinafter, the vehicle structure 10 with an anchor unit may be abbreviated as "the vehicle structure 10." The vehicle structure 10 includes left and right rear side frames (rear side frame) 11 and 12, left and right damper housings (damper housing) 13 and 14, left and right reinforcement frames (reinforcement frame) 15 and 16, a rear floor panel 17, a rear cross member (cross member) 18, left and right stiffeners (stiffener) 21 and 22 (see FIG. 4), and an anchor unit (anchor attachment structure) 25. For example, an attachment portion of a child seat 101 disposed on a rear seat 102 is attached to the anchor unit 25.

<Rear Side Frame>

The left rear side frame 11 and the right rear side frame 12 are disposed on an outer side of the rear floor panel 17, which will be described below, in a vehicle width direction (i.e., left and right outer sides), for example, in a vehicle rear section. The left rear side frame 11 and the right rear side frame 12 are, for example, frame members with high rigidity that constitute a part of a vehicle body frame by being formed in a closed hollow cross section.

The left rear side frame 11 extends from a rear end portion of a left side sill 31 toward the rear of the vehicle. That is, the left rear side frame 11 extends in a vehicle forward/rearward direction on a left outer side in a vehicle width direction. The right rear side frame 12 extends from a rear end portion of a right side sill 32 toward the rear of the vehicle. That is, the right rear side frame 12 extends in the vehicle forward/rearward direction on a right outer side in the vehicle width direction.

<Damper Housing>

The left damper housing 13 is disposed on a left outer side of the left rear side frame 11 in the vehicle width direction (on an outer side in the vehicle width direction). The left damper housing 13 overhangs outward from the left rear side frame 11 in the vehicle width direction (leftward), and is formed to cover a left damper or a left rear wheel (not shown) from above.

The right damper housing 14 is disposed on a right outer side of the right rear side frame 12 in the vehicle width direction (an outer side in the vehicle width direction). The right damper housing 14 overhangs outward from the right rear side frame 12 in the vehicle width direction (rightward), and is formed to cover a right damper or a right rear wheel (not shown) from above.

<Reinforcement Frame>

The left reinforcement frame 15 is disposed on an inner surface of the left damper housing 13 on an inner side in the vehicle width direction and extends in the vehicle upward/downward direction (hereinafter, may be referred to as an upward/downward direction). Specifically, the left reinforcement frame 15 rises upward from a left end portion 18a of the rear cross member 18 along the inner surface of the left damper housing 13, which will be described below.

The right reinforcement frame 16 is disposed on an inner surface of the right damper housing 14 on an inner side in the vehicle width direction and extends in the upward/downward direction. Specifically, the right reinforcement frame 16 rises upward from a right end portion 18b of the rear cross member 18 along the inner surface of the right damper housing 14.

<Rear Floor Panel>

Figure 3:
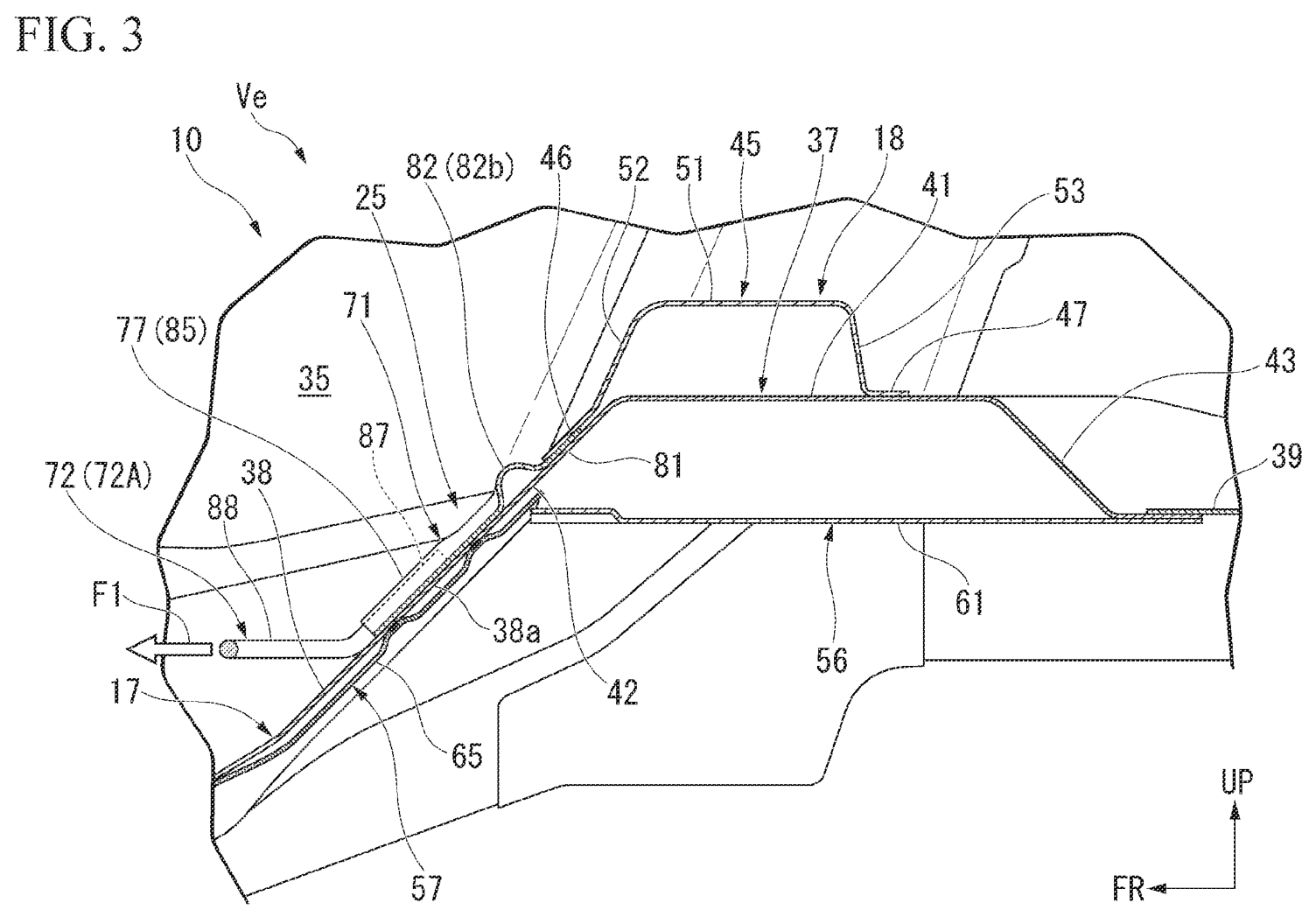

FIG. 3 is a cross-sectional view along line III-III in FIG. 2.

As shown in FIG. 2 and FIG. 3, the rear floor panel 17 is disposed between the left rear side frame 11 and the right rear side frame 12. The rear floor panel 17 has a left side portion bonded to the left rear side frame 11 and a right side portion bonded to the right rear side frame 12. The rear floor panel 17 forms a floor portion of a passenger compartment 35. A rear seat 102 is disposed above the rear floor panel 17.

In the rear floor panel 17, an area 37 (see FIG. 3) between the left reinforcement frame 15 and the right reinforcement frame 16 protrudes upward. Hereinafter, the area 37 protruding upward may be referred to as "a panel protrusion 37." In addition, in another area of the rear floor panel 17 except the panel protrusion 37, a front side of the panel protrusion 37 of the vehicle may be referred to as "a front panel main body 38" and a rear side of the panel protrusion 37 of the vehicle may be referred to as "a rear panel main body 39."

The front panel main body 38 has a panel wall portion (wall) 38a on which a first anchor member 72 (to be described below) is supported. The panel wall portion 38a forms a wall that is inclined downward from the panel protrusion 37 toward the front of the vehicle. In other words, the panel wall portion 38a forms a wall extending in the upward/downward direction.

The panel protrusion 37 protrudes, for example, upward in a trapezoidal shape. Specifically, the panel protrusion 37 has a panel apex portion 41, a first panel inclination portion 42, and a second panel inclination portion 43. The panel apex portion 41 is formed substantially horizontally. The first panel inclination portion 42 is inclined downward from a front side of the panel apex portion 41 to the front panel main body 38 (specifically, the panel wall portion 38a) in the front of the vehicle. The second panel inclination portion 43 is inclined downward from a rear side of the panel apex portion 41 to the rear panel main body 39 in the rear of the vehicle. The panel protrusion 37 is formed to protrude upward in a trapezoidal shape by the panel apex portion 41, the first panel inclination portion 42, and the second panel inclination portion 43.

<Rear Cross Member>

The rear cross member 18 is a floor cross member disposed between the left reinforcement frame 15 and the right reinforcement frame 16, extending in the vehicle width direction and joined to the panel protrusion 37 of the rear floor panel 17. Specifically, in the rear cross member 18, the left end portion 18a is connected to a lower end portion of the left reinforcement frame 15, and the right end portion 18b is connected to a lower end portion of the right reinforcement frame 16.

The rear cross member 18 includes a cross section forming portion 45, a first flange portion (flange portion) 46, and a second flange portion 47. The cross section forming portion 45 has a cross member apex portion 51, a first cross member wall portion 52, and a second cross member wall portion 53.

The cross member apex portion 51 is disposed above the panel apex portion 41. The first cross member wall portion 52 is inclined downward from a front side of the cross member apex portion 51 to the first panel inclination portion 42 toward the front of the vehicle. The second cross member wall portion 53 is inclined downward from a rear side of the cross member apex portion 51 to the panel apex portion 41 toward the rear of the vehicle.

The cross section forming portion 45 is formed to protrude upward in a trapezoidal shape by the cross member apex portion 51, the first cross member wall portion 52, and the second cross member wall portion 53.

The first flange portion 46 extends downward from a lower side of the first cross member wall portion 52 along the first panel inclination portion 42 toward the front of the vehicle. A reinforcement member 71, which will be described below, is sandwiched between the first flange portion 46 and the first panel inclination portion 42. The first flange portion 46, the first panel inclination portion 42, and the reinforcement member 71 are bonded while overlapping each other. In other words, the first flange portion 46 is joined to the first panel inclination portion 42 (i.e., the rear floor panel 17) via the reinforcement member 71.

The second flange portion 47 extends from a lower side of the second cross member wall portion 53 along the panel apex portion 41 toward the rear of the vehicle. The second flange portion 47 is bonded to the panel apex portion 41 from above. Accordingly, the rear cross member 18 is bonded to the panel protrusion 37.

In this case, the rear cross member 18 is located behind the first anchor member 72 of the vehicle, which will be described below.

In addition, in a state in which the rear cross member 18 is joined to the panel protrusion 37, a closed hollow cross section (hollow cross section) is formed by the cross section forming portion 45 of the rear cross member 18 and the panel protrusion 37 (i.e., the rear floor panel 17). Accordingly, rigidity of the rear cross member 18 is increased. Further, in the rear cross member 18, the left end portion 18a is connected to a lower end portion of the left reinforcement frame 15, and the right end portion 18*b* is connected to a lower end portion of the right reinforcement frame.

<Stiffener>

Figure 4:
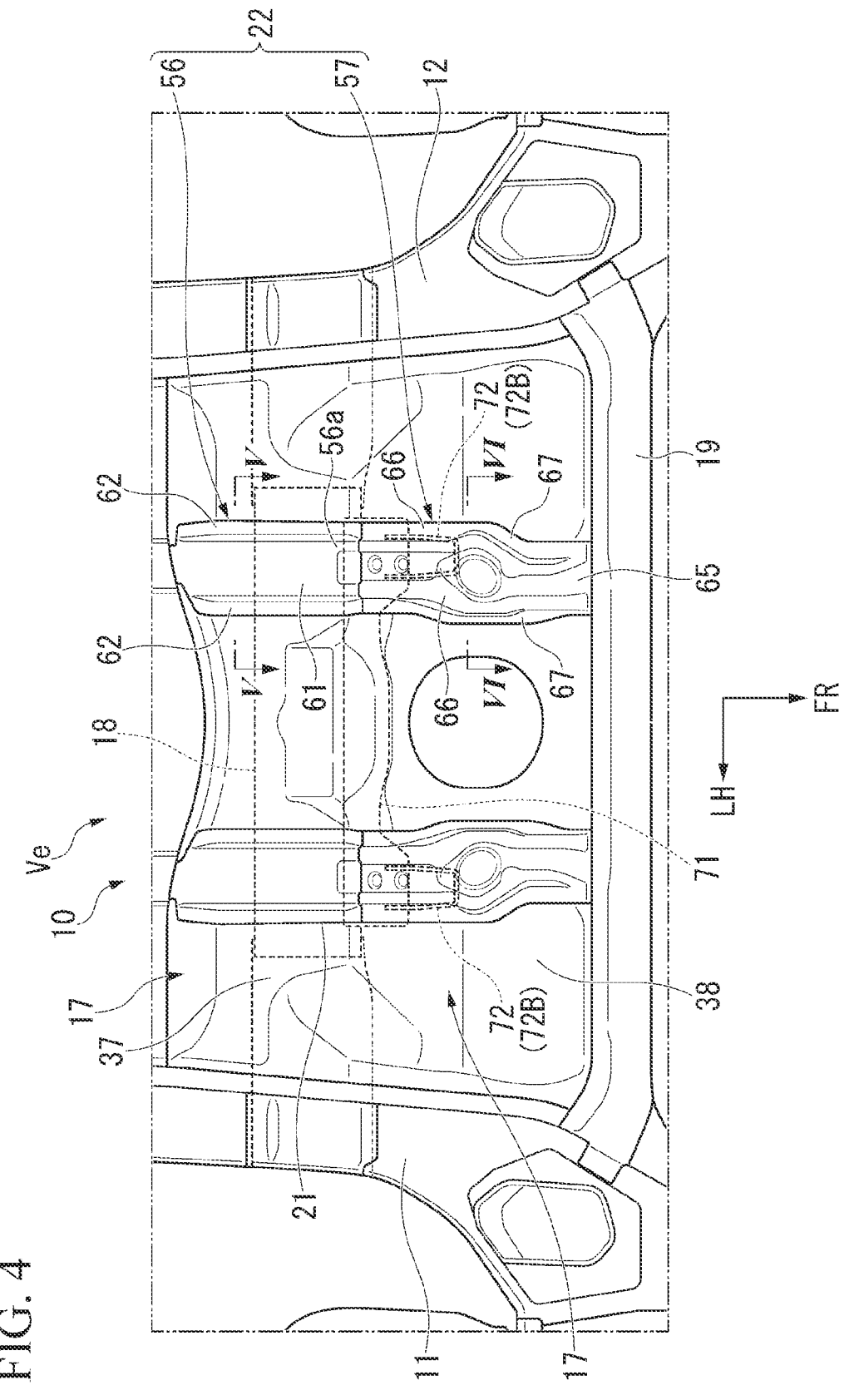
FIG. 4 is a bottom view showing a vehicle structure with an anchor unit according to the embodiment of the present invention.
Figure 5:
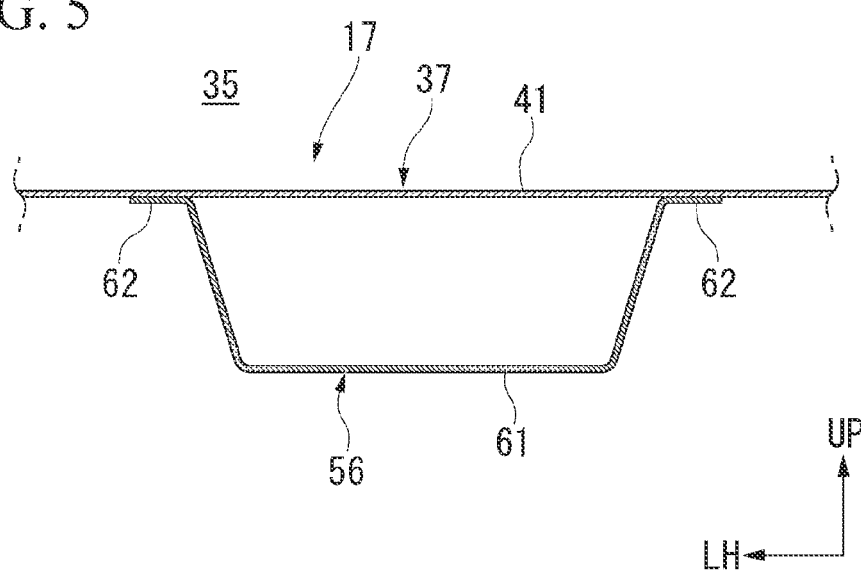
FIG. 5 is a cross-sectional view along line V-V in FIG. 4.
Figure 6:
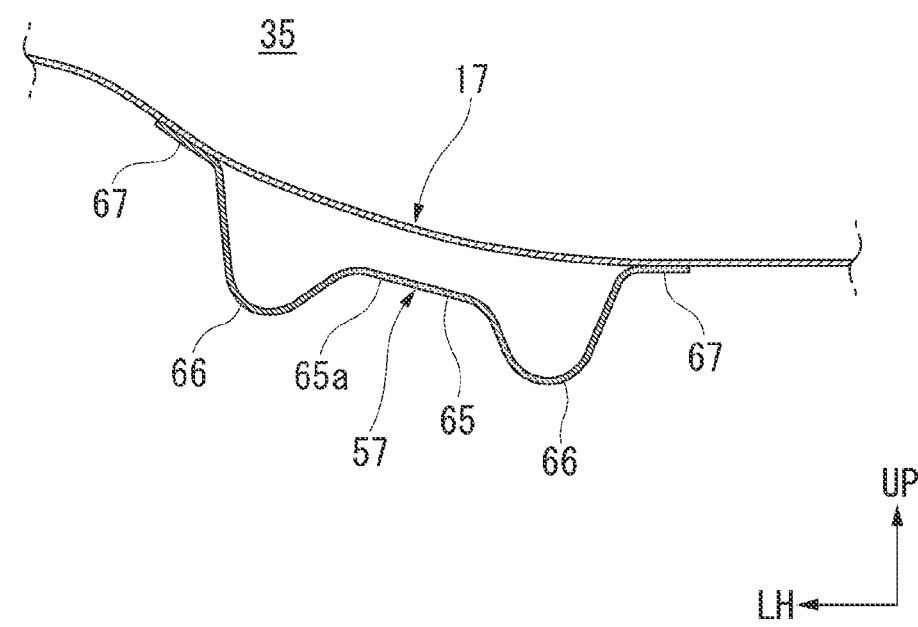
FIG. 6 is a cross-sectional view along line VI-VI in FIG. 4.

FIG. 4 is a bottom view showing the vehicle structure 10 with an anchor unit according to the embodiment. FIG. 5 is a cross-sectional view along line V-V in FIG. 4. FIG. 6 is a cross-sectional view along line VI-VI in FIG. 4.

As shown in FIG. 4 to FIG. 6, the left stiffener 21 and the right stiffener 22 are provided on the rear floor panel 17. The left stiffener 21 and the right stiffener 22 are provided on an outer side of the passenger compartment 35 of the rear floor panel 17 (i.e., a lower side of the rear floor panel 17). The left stiffener 21 and the right stiffener 22 are disposed on left and right sides from a center in the vehicle width direction at an interval and extend in the vehicle forward/rearward direction.

The left stiffener 21 and the right stiffener 22 extend from a front cross member 19 toward the rear of the vehicle. The front cross member 19 is disposed in front of the reinforcement member 71 of the vehicle, which will be described below. The left stiffener 21 and the right stiffener 22 extend to the rear of the vehicle to cross the rear cross member 18 (see also FIG. 2), and are bonded to each other while crossing the rear cross member 18. That is, the left stiffener 21 and the right stiffener 22 extend from the front of the reinforcement member 71 of the vehicle to the rear of the vehicle to cross the rear cross member 18.

The right stiffener 22 includes a stiffener upper portion 56 and a stiffener lower portion 57.

The stiffener upper portion 56 includes an upper main body portion 61 and a pair of upper flanges 62. The upper main body portion 61 protrudes in a U-shaped cross section by being curved to protrude downward. The pair of upper flanges 62 overhang from both end portions of the upper main body portion 61 toward an outer side of the upper main body portion 61. That is, the stiffener upper portion 56 is formed in a hat-shaped cross section by the upper main body portion 61 and the pair of upper flanges 62.

The pair of upper flanges 62 are bonded to a back surface of the panel protrusion 37 from below. In this state, the stiffener upper portion 56 is disposed in the vehicle forward/rearward direction and joined with crossing the rear cross member 18. In this state, a closed hollow cross section is formed by the stiffener upper portion 56 and the panel protrusion 37 (i.e., the rear floor panel 17). Accordingly, rigidity of the stiffener upper portion 56 is increased. The stiffener lower portion 57 is disposed in front of the stiffener upper portion 56 of the vehicle (see also FIG. 3).

The stiffener lower portion 57 extends from the front cross member 19 to a tip portion 56*a* of the stiffener upper portion 56 toward the rear of the vehicle. The stiffener lower portion 57 includes a lower main body portion 65, a plurality of (in the embodiment, a pair of) front and rear beads 66, and a pair of lower flanges 67. While the pair of front and rear beads 66 are exemplarily described as the plurality of front and rear beads 66 in the embodiment, the number of the front and rear beads 66 may be selected arbitrarily.

The lower main body portion 65 is curved to protrude downward. The pair of front and rear beads 66 are formed at both side portions (left and right side portions) of a bottom portion 65*a* of the lower main body portion 65 in the vehicle width direction with an interval therebetween. The pair of front and rear beads 66 are formed on both sides (left and right sides) in the vehicle width direction, and extend in a longitudinal direction (i.e., the vehicle forward/rearward direction) of the stiffener lower portion 57. The pair of front and rear beads 66 protrude from both sides of the bottom portion 65*a* of the lower main body portion 65 to protrude downward.

The pair of lower flanges 67 overhang from both end portions of the lower main body portion 65 toward an outer side of the lower main body portion 65. The pair of lower flanges 67 are bonded to a back surface of the front panel main body 38 (see also FIG. 3) from below. In this state, the stiffener lower portion 57 is disposed in the vehicle forward/rearward direction. A closed hollow cross section is formed by the stiffener lower portion 57 and the front panel main body 38 (i.e., the rear floor panel 17). Accordingly, rigidity of the stiffener lower portion 57 is increased.

Accordingly, rigidity of the stiffener upper portion 56 and the stiffener lower portion 57 (i.e., the right stiffener 22) is increased.

Since the left stiffener 21 is formed substantially symmetrical to the right stiffener 22, detailed description thereof will be omitted.

<Anchor Unit>

Figure 7:
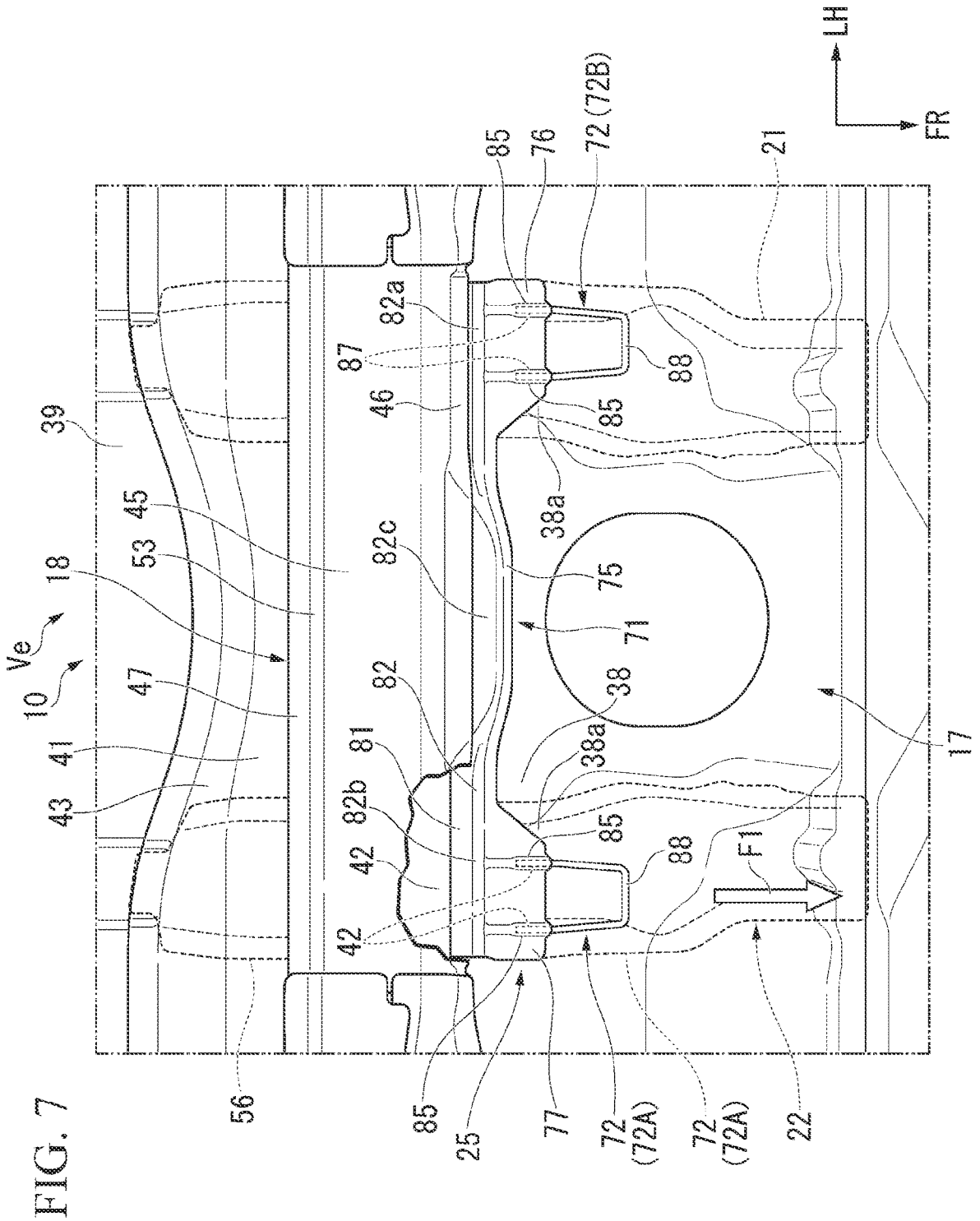
FIG. 7 is a plan view showing the vehicle structure with an anchor unit according to the embodiment of the present invention.

FIG. 7 is a plan view showing the vehicle structure 10 with an anchor unit according to the embodiment.

As shown in FIG. 2, FIG. 3 and FIG. 7, the anchor unit 25 is provided in front of the rear cross member 18 of the vehicle. The anchor unit 25 includes the reinforcement member 71, a plurality of first anchor members (anchor members) 72, and a plurality of second anchor members (another anchor members) 73. The first anchor members 72 and the second anchor members 73 are, for example, strikers to which attachment portions of a child seat 101 are attached.

In the embodiment, "the pair of first anchor members 72" are exemplified as the plurality of first anchor members 72, the right side in the vehicle width direction will be described as the first anchor members 72A, and the left side in the vehicle width direction will be described as the first anchor members 72B. In addition, "the pair of second anchor members 73" are exemplified as the plurality of second anchor members 73, the right side in the vehicle width direction will be described as the second anchor members 73A, and the left side in the vehicle width direction will be described as the second anchor members 73B.

Further, the numbers of the first anchor members 72 and the second anchor members 73 are not limited to the example of the embodiment and may be selected arbitrarily.

The reinforcement member 71 is a member configured to support the pair of first anchor members 72 in front of the rear cross member 18 of the vehicle. The reinforcement member 71 has a reinforcement base 75, a left support portion 76, and a right support portion 77. The reinforcement base 75 extends along the first flange portion 46 of the rear cross member 18 in the vehicle width direction. In this state, the reinforcement base 75 bridges between the left stiffener 21 and the right stiffener 22 via the first flange portion 46.

Specifically, the reinforcement base 75 has an upper joining portion 81 and a lateral bead 82. The upper joining portion 81 is an area that forms an upper side portion of the reinforcement base 75. The upper joining portion 81 is joined to the first panel inclination portion 42 and the first flange portion 46 while being sandwiched between the first panel inclination portion 42 and the first flange portion 46. In a state in which the upper joining portion 81 is bonded to the first panel inclination portion 42 and the first flange portion 46, the reinforcement member 71 is bonded in a longitudinal direction (i.e., vehicle width direction) of the rear cross member 18.

In addition, in a state in which the upper joining portion 81 is joined to the first panel inclination portion 42 and the first flange portion 46, the lateral bead 82 extends in the longitudinal direction (i.e., vehicle width direction). The lateral bead 82 protrudes in a curved shape toward the front of the vehicle while extending in the longitudinal direction of the reinforcement base 75 (i.e., the reinforcement member 71).

Specifically, in the lateral bead 82, for example, in the vehicle width direction, a left side portion 82a and a right side portion 82b protrude in a curved shape toward the front of the vehicle at the same height, and a center portion 82c protrudes with respect to the left side portion 82a and the right side portion 82b in a largely curved shape toward the front of the vehicle. Further, the entire lateral bead 82 may protrude in a curved shape toward the front of the vehicle at the same height.

The right support portion 77 is integrally formed with a right end portion of the reinforcement base 75. The right support portion 77 extends with a downward slope from the right end portion of the reinforcement base 75 along the front panel main body 38 of the rear floor panel 17 toward the front of the vehicle. The right support portion 77 is bonded to the front panel main body 38. In this state, the right support portion 77 overlaps at least a part of the stiffener lower portion 57 (for example, parts of the lower flanges 67) in the upward/downward direction, and is joined to the parts of the lower flanges 67 via the front panel main body 38.

The right support portion 77 includes a pair of attachment beads 85. The pair of attachment beads 85 are disposed in the vehicle width direction at an interval, and extend with a downward slope from the right side portion 82b of the lateral bead 82 along the front panel main body 38 toward the front of the vehicle. That is, the pair of attachment beads 85 are continuous with the lateral bead 82.

The pair of attachment beads 85 protrude in a curved shape in a direction in which it is separated upward from the front panel main body 38. The pair of attachment beads 85 form a space between the attachment beads 85 and the front panel main body 38 in a state in which the upper joining portion 81 is joined to the front panel main body 38. The left support portion 76 includes the pair of attachment beads 85, like the right support portion 77. The left support portion 76 is integrally connected to the right support portion 77 via the reinforcement base 75. The left support portion 76 is formed substantially symmetrical to the right support portion 77. Accordingly, hereinafter, detailed description of the left support portion 76 will be omitted.

The first anchor members 72A attached to the pair of attachment beads 85 of the right support portion 77.

The first anchor members 72A include a pair of leg portions (fixing portions) 87, and locking portions 88.

The locking portions 88 each is formed in a U shape when seen in a plan view. The pair of leg portions 87 extend from the tips of the locking portions 88 toward the rear of the vehicle, and are supported by the pair of attachment beads 85.

The pair of leg portions 87 are bonded by, for example, welding while being disposed in the recesses of the pair of attachment beads 85. In this state, since the right support portion 77 is bonded to the panel wall portion 38a of the front panel main body 38, the leg portions 87 are supported by (attached to) a space between the attachment beads 85 and the panel wall portion 38a.

The panel wall portion 38a forms a wall extending in the upward/downward direction. Accordingly, the pair of leg portions 87 are supported along the panel wall portion 38a extending in the upward/downward direction.

Here, the pair of attachment beads 85 are continuous with the lateral bead 82. In addition, the locking portions 88 extend from front end portions of the pair of leg portions 87 toward the front of the vehicle. Accordingly, the locking portions 88 are disposed above the front panel main body 38 at an interval. That is, the pair of leg portions 87 and the locking portions 88 are folded in a V shape when seen in a side view.

In this way, the first anchor members 72A are formed integrally with the pair of leg portions 87 and the locking portion 88. Accordingly, the first anchor members 72A are attached to the pair of attachment beads 85 continuous with the lateral bead 82.

In addition, since the pair of leg portions 87 and the locking portion 88 are folded in a V shape when seen in a side view, in a state in which the pair of leg portions 87 are supported along the panel wall portion 38a extending in the upward/downward direction, the locking portions 88 can be disposed above the panel wall portion 38a at an interval.

The first anchor members 72B are supported by the pair of attachment beads 85 of the left support portion 76. The first anchor members 72B of the left support portion 76 are formed substantially symmetrical to the first anchor members 72A of the right support portion 77. Accordingly, hereinafter, detailed description of the first anchor members 72B of the left support portion 76 will be omitted.

Here, the right support portion 77 and the left support portion 76 are integrally connected by the reinforcement base 75. That is, the reinforcement member 71 is formed integrally with the right support portion 77, the left support portion 76, and the reinforcement base 75. Accordingly, the first anchor members 72A of the right support portion 77 and the first anchor members 72B of the left support portion 76 are connected to the first panel inclination portion 42 and the front panel main body 38 (i.e., the rear floor panel 17) by the reinforcement member 71. Further, the first anchor members 72A and the first anchor members 72B are installed on the rear floor panel 17 while being connected by the reinforcement member 71.

In addition, the rear cross member 18 is provided behind the first anchor members 72A and the first anchor members 72B of the vehicle. In the rear cross member 18, the cross section forming portion 45 forms a closed hollow cross section together with the panel protrusion 37 (i.e., the rear floor panel 17). Accordingly, rigidity of the rear cross member 18 is increased.

The pair of second anchor members 73 are provided on the right rear side frame 12 and the left rear side frame 11. Specifically, the second anchor members 73A on the right side of the pair of second anchor members 73 in vehicle width direction is bonded to, for example, an upper portion 12a of the right rear side frame 12 by a right support bracket 92 through welding or the like. In addition, the second anchor members 73B on the left side of the pair of second anchor members 73 in the vehicle width direction is bonded to, for example, an upper portion 11a of the left rear side frame 11 by a left support bracket 91 through welding or the like.

The first anchor members 72A and the second anchor members 73A are provided on the right side in the vehicle width direction.

The first anchor members 72A and the second anchor members 73A support a child seat 101 in a rear seat 102 on the right side in the vehicle width direction. Specifically, the child seat 101 is disposed on the right side of the rear seat

102 in the vehicle width direction, and a fixture (not shown) provided on the rear section of the child seat 101 is attached to the first anchor members 72A and the second anchor members 73A. Accordingly, the child seat 101 is attached (connected) to the right side of the rear seat 102 in the vehicle width direction.

In addition, the first anchor members 72B and the second anchor members 73B are provided on the left side in the vehicle width direction. The first anchor members 72B and the second anchor members 73B support the child seat 101 on the left side of the rear seat 102 in the vehicle width direction. Specifically, the child seat 101 is disposed on the left side of the rear seat 102 in the vehicle width direction, and the fixture (not shown) provided on the rear section of the child seat 101 is attached to the first anchor members 72B and the second anchor members 73B. Accordingly, the child seat 101 is attached (connected) to the left side of the rear seat 102 in the vehicle width direction.

As described above, the following actions and effects can be obtained according to the vehicle structure 10 with an anchor unit according to the embodiment. Further, in the following description, any one of the pair of first anchor members 72 will be described as the first anchor member 72A, and any one of the pair of second anchor members 73 will be described as the second anchor member 73A. That is, hereinafter, an example in which the child seat 101 is connected to the first anchor member 72A and the second anchor member 73A will be described.

As shown in FIG. 2 and FIG. 7, the child seat 101 is connected the first anchor member 72A and the second anchor member 73A. Accordingly, for example, it is conceivable that an excessive tensile load F1 is input from the child seat 101 to the first anchor member 72A and the second anchor member 73A to which the child seat 101 is connected. Here, the first anchor member 72A and the first anchor member 72B are connected to the rear floor panel 17 by the reinforcement member 71. That is, the first anchor member 72A and the first anchor member 72B are connected by the one reinforcement member 71.

Accordingly, when the tensile load F1 is input from the child seat 101 to the first anchor member 72A, the input tensile load F1 can be transmitted from the first anchor members 72A toward the first anchor member 72B via the reinforcement member 71. Accordingly, the input tensile load F1 can be supported by the first anchor member 72A and the first anchor member 72B. Accordingly, it is possible to curb the first anchor member 72A being damaged (breaking) by the tensile load F1 or the rear floor panel 17 from being deformed. Accordingly, there is no need to individually provide a reinforcement member for each of the first anchor member 72A and the first anchor member 72B, and reduction in weight of the vehicle Ve or habitability of the passenger compartment 35 cannot be hindered.

As shown in FIG. 3 and FIG. 7, the pair of leg portions 87 are supported by the panel wall portion 38a extending in the upward/downward direction. The panel wall portion 38a is, for example, increased in rigidity by being extended in the upward/downward direction. Accordingly, the first anchor members 72A and the first anchor members 72B can be strongly supported by the panel wall portion 38a. Accordingly, it is possible to suppress the first anchor members 72A from being damaged due to the tensile load F1 input from the child seat 101 or the rear floor panel 17 from being deformed.

As shown in FIG. 2 and FIG. 7, the reinforcement member 71 is bonded in a longitudinal direction (i.e., the vehicle width direction) of the rear cross member 18.

Accordingly, the tensile load F1 input to the first anchor members 72A can be transmitted to the rear cross member 18 from the first anchor members 72A via the reinforcement member 71.

Accordingly, the input tensile load F1 can be supported by the rear cross member 18. Accordingly, it is possible to suppress the first anchor members 72A from being damaged due to the tensile load F1 or the rear floor panel 17 from being deformed.

As shown in FIG. 3 and FIG. 7, in a state in which the upper joining portion 81 of the reinforcement member 71 is sandwiched between the first panel inclination portion 42 and the first flange portion 46, the upper joining portion 81 is bonded to the first panel inclination portion 42 and the first flange portion 46. Accordingly, the reinforcement member 71 can be strongly bonded to the rear cross member 18. Accordingly, the tensile load F1 input from the first anchor members 72A to the reinforcement member 71 can be transmitted to the cross section forming portion 45 of the rear cross member 18 via the first flange portion 46.

The cross section forming portion 45 of the rear cross member 18 is increased in rigidity by forming the closed hollow cross section together with the panel protrusion 37 (the rear floor panel 17). Accordingly, the transmitted tensile load F1 can be supported by the cross section forming portion 45 (i.e., the rear cross member 18). Accordingly, it is possible to prevent the reinforcement member 71 from peeling off from the rear floor panel 17 and suppress deformation of the rear floor panel 17.

As shown in FIG. 2 and FIG. 7, the first anchor members 72A is attached to the pair of attachment beads 85 in the reinforcement member 71, and the pair of attachment beads 85 is continuous with the lateral bead 82 of the reinforcement base 75. Accordingly, the tensile load F1 input from the first anchor members 72A can be transmitted to the lateral bead 82 via the pair of attachment beads 85. That is, rigidity of the reinforcement member 71 against the tensile load F1 can be increased. Accordingly, the tensile load F1 input from the child seat 101 can be appropriately transmitted to the rear cross member 18 via the reinforcement member 71. Accordingly, it is possible to suppress the first anchor members 72A from being damaged due to the tensile load F1 or the rear floor panel 17 from being deformed.

As shown in FIG. 4 and FIG. 7, the left stiffener 21 and the right stiffener 22 are provided on the rear floor panel 17. Hereinafter, the right stiffener 22 will be described, and description of the left stiffener 21 will be omitted. A part of the lower flange 67 of the stiffener lower portion 57 in the right stiffener 22 is joined to the right support portion 77 of the reinforcement member 71 via the front panel main body 38. Accordingly, the tensile load F1 input from the first anchor members 72A can be transmitted to the right stiffener 22 via the reinforcement member 71.

Accordingly, rigidity of the rear floor panel 17 against the tensile load F1 can be increased around the first anchor members 72A. Accordingly, it is possible to suppress deformation of the rear floor panel 17 due to the tensile load F1.

In addition, the right stiffener 22 extends to cross the rear cross member 18, and the pair of front and rear beads 66 (see also FIG. 6) extending in the longitudinal direction (i.e., the vehicle forward/rearward direction) is provided on the right stiffener 22 (specifically, the stiffener lower portion 57). Accordingly, the tensile load F1 input from the first anchor members 72A can be transmitted to the rear cross member 18 via the right stiffener 22 (in particular, the pair of front and rear beads 66).

Accordingly, rigidity of the rear floor panel 17 against the tensile load F1 can be further increased around the first anchor members 72A. Accordingly, it is possible to suppress deformation of the rear floor panel 17 due to the tensile load F1.

As shown in FIG. 1, for example, the left rear side frame 11 and the right rear side frame 12 are disposed on an outer side (i.e., left and right outer sides) of the rear floor panel 17 in vehicle rear section in the vehicle width direction. In addition, the left damper housing 13 is disposed on a left outer side of the left rear side frame 11 in the vehicle width direction (an outer side in the vehicle width direction). The right damper housing 14 is provided on a right outer side of the right rear side frame 12 in the vehicle width direction (an outer side in the vehicle width direction).

Further, the left reinforcement frame 15 is disposed on the left damper housing 13, and the right reinforcement frame is disposed on the right damper housing 14. In addition, the left end portion 18*a* of the rear cross member 18 is connected to the left reinforcement frame 15, and the right end portion 18*b* of the rear cross member 18 is connected to the right reinforcement frame 16.

Accordingly, the tensile load F1 input from the first anchor members 72A can be transmitted to the right reinforcement frame 16 or the left reinforcement frame 15 via the reinforcement member 71 and the rear cross member 18. Accordingly, rigidity of the rear floor panel 17 against the tensile load F1 can be further increased around the first anchor members 72A. Accordingly, deformation of the rear floor panel 17 due to the tensile load F1 can be suppressed.

As shown in FIG. 2, the fixture (not shown) of the child seat 101 is attached to the first anchor members 72A and the second anchor members 73A. Here, the first anchor members 72A and the first anchor members 72B are connected by the reinforcement member 71. Accordingly, the tensile load F1 is input to the first anchor members 72A and the second anchor members 73A by the child seat 101, the tensile load F1 input to the first anchor members 72A can be transmitted toward the first anchor members 72B via the reinforcement member 71. Accordingly, the input tensile load F1 can be supported by the first anchor members 72A and the first anchor members 72B. Accordingly, it is possible to suppress the first anchor members 72A from being damaged due to the tensile load F1 or the rear floor panel 17 from being deformed.

Further, the technical scope of the present invention is not limited to the embodiment, and various modifications may be made without departing from the scope of the present invention.

In addition, it is possible to replace the components in the embodiment with known components as appropriate without departing from the scope of the present invention, and the above-mentioned variants may be combined as appropriate.

What is claimed is:

1. A vehicle structure with an anchor unit comprising: a rear floor panel above which a rear seat is disposed; a plurality of first anchor members disposed on the rear floor panel and to which a child seat is attached; and a reinforcement member that connects the first anchor members to the rear floor panel, wherein the reinforcement member connects the plurality of first anchor members, the reinforcement member includes an attachment bead to which the first anchor member is attached, and the attachment bead is continuous with a lateral bead extending in a longitudinal direction of the reinforcement member.

2. The vehicle structure with an anchor unit according to claim 1, wherein the first anchor member has:

a fixing portion formed along a wall extending in an upward/downward direction of the rear floor panel; and a locking portion extending in a vehicle forward direction from the fixing portion.

3. The vehicle structure with an anchor unit according to claim 1, comprising:

a cross member that forms a hollow cross section together with the rear floor panel at a vehicle rearward side of the first anchor member, wherein the reinforcement member is joined along a longitudinal direction of the cross member.

4. The vehicle structure with an anchor unit according to claim 3, wherein the cross member comprises:

a cross section forming portion that forms a hollow cross section together with the rear floor panel; and a flange portion joined to the rear floor panel, and the reinforcement member is joined in a state where the reinforcement member is sandwiched between the rear floor panel and the flange portion.

5. The vehicle structure with an anchor unit according to claim 4, comprising:

a stiffener extending in a vehicle forward/rearward direction on an outer side of a passenger compartment of the rear floor panel, wherein the stiffener overlaps the reinforcement member in an upward/downward direction, and at least part of the stiffener is joined to the reinforcement member.

6. The vehicle structure with an anchor unit according to claim 5, wherein the stiffener includes front and rear beads extending from a vehicle further forward position than the reinforcement member to a vehicle rearward direction so as to cross the cross member and extending in the vehicle forward/rearward direction.

7. The vehicle structure with an anchor unit according to claim 3, comprising:

a rear side frame extending in a vehicle forward/rearward direction at an outer side in a vehicle width direction of the rear floor panel;

a damper housing disposed on an outer side in the vehicle width direction of the rear side frame; and a reinforcement frame disposed on the damper housing and extending in a vehicle upward/downward direction, wherein the cross member is connected to the reinforcement frame.

8. The vehicle structure with an anchor unit according to claim 7, comprising:

a second anchor member provided on the rear side frame, wherein a child seat is attached to the first anchor member and the second other anchor member.

* * * * *